United States Patent
Shimanuki

(10) Patent No.: US 7,123,436 B2
(45) Date of Patent: Oct. 17, 2006

(54) DEVICE, METHOD AND COMPUTER PROGRAM FOR CARRYING AND HOUSING CARTRIDGE, AND STORAGE MEDIUM STORING SAME COMPUTER PROGRAM

(75) Inventor: Hiroyuki Shimanuki, Tokyo (JP)

(73) Assignee: NEC Corporation, Tokyo (JP)

( * ) Notice: Subject to any disclaimer, the term of this patent is extended or adjusted under 35 U.S.C. 154(b) by 19 days.

(21) Appl. No.: 10/830,316

(22) Filed: Apr. 23, 2004

(65) Prior Publication Data

US 2004/0212911 A1   Oct. 28, 2004

(30) Foreign Application Priority Data

Apr. 23, 2003   (JP)   ............... 2003-118761

(51) Int. Cl.
 G11B 15/68   (2006.01)
 G11B 15/18   (2006.01)
(52) U.S. Cl. .......................... 360/92; 360/69
(58) Field of Classification Search ................. 360/88, 360/92
 See application file for complete search history.

(56) References Cited

U.S. PATENT DOCUMENTS 5,739,978 A * 4/1998 Ellis et al. .................. 360/92
5,760,995 A * 6/1998 Heller et al. ................. 360/92
6,457,928 B1 * 10/2002 Ryan .......................... 414/281

FOREIGN PATENT DOCUMENTS

| JP | H04-319564 A | 11/1992 |
| JP | H05-342723 A | 12/1993 |
| JP | H05-342724 A | 12/1993 |
| JP | H10-92069 A | 4/1998 |

* cited by examiner

Primary Examiner—Wayne Young
Assistant Examiner—Jason Olson
(74) Attorney, Agent, or Firm—Sughrue Mion, PLLC

(57) ABSTRACT

A cartridge carrying/housing device is provided which is capable of reducing an access distance to a targeted position or an access time required to reach the targeted position. The cartridge carrying/housing device has a cell in which two or more slots each housing a magnetic tape cartridge are arranged in one specified direction and a picker to move according to control based on the number of driving pulses of a stepping motor and to count the number of driving pulses produced before a notch of a targeted slot is detected by a hand-pass sensor and is so configured that part of a cartridge being housed in the cell protrudes through a slot and that the notch is formed in a flat-plate shaped protrusion formed in the slot and, in a state where a cartridge has been housed, a cartridge and a portion including the flat-shaped protrusion are closely positioned or partially overlap each other so that the hand-pass sensor can detect only the notch.

40 Claims, 11 Drawing Sheets

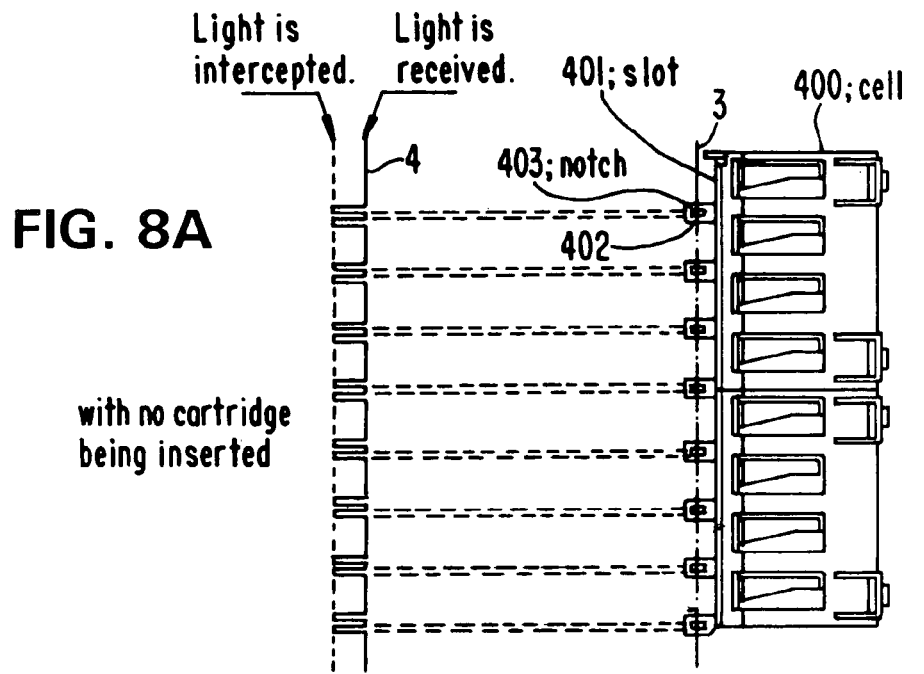
FIG. 8A with no cartridge being inserted
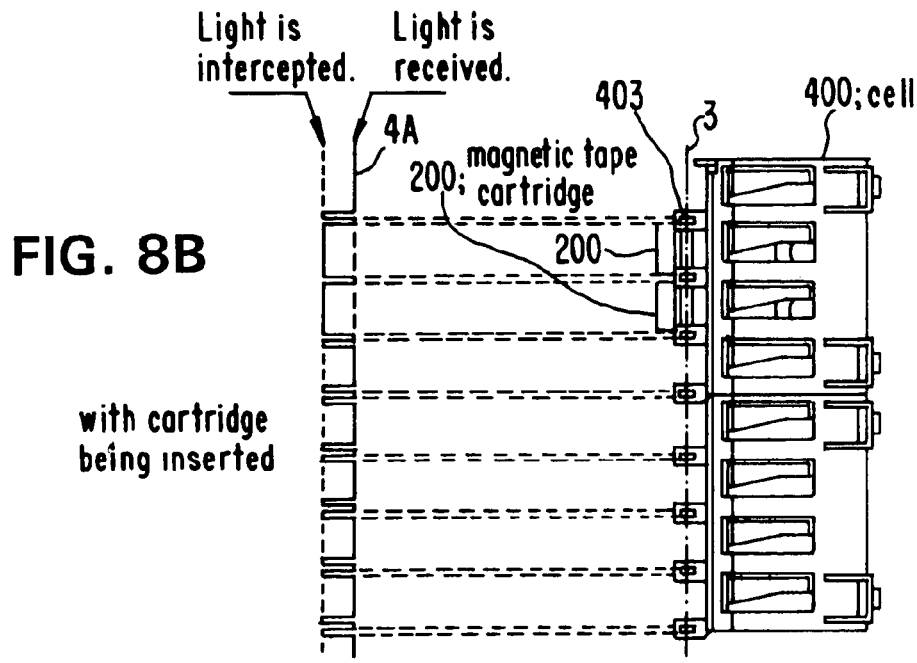
FIG. 8B with cartridge being inserted

DEVICE, METHOD AND COMPUTER PROGRAM FOR CARRYING AND HOUSING CARTRIDGE, AND STORAGE MEDIUM STORING SAME COMPUTER PROGRAM

BACKGROUND OF THE INVENTION

1. Field of the Invention

The present invention relates to a device, a method and a computer program for carrying and housing two or more cartridges each having a magnetic storing medium, and a storage medium storing a same computer program, and more particularly to an improvement in positioning of a carrying mechanism for carrying the two or more cartridges.

The present application claims priority of Japanese Patent Application No. 2003-118761 filed on Apr. 23, 2003, which is hereby incorporated by reference.

2. Description of the Related Art

As an example of the cartridge carrying/housing device, a magnetic tape library device is showed. Conventionally, various methods and units for positioning of a carrying mechanism employed in a magnetic tape library device are proposed. For example, in Japanese Patent Application Laid-open No. Hei 04-319564, a method is provided in which an end portion of a housing shelf that houses a medium or a reading and writing mechanism is detected by a reflection sensor attached to a carrying mechanism used to transport the medium and also a reference pattern on a flag mounted in parallel to a spline used to guide the carrying mechanism is detected by a flag sensor attached to the carrying mechanism and an interval between a pulse output from the reflection sensor and a pulse output from the flag sensor is measured by using an output pulse of an encoder indicating an amount of revolutions of a motor to drive the carrying mechanism and results from the measurements are stored in memory. When ordinary positioning operations are performed, a stop position of a motor is controlled according to positional data of a targeted shelf read from the memory.

In a magnetic tape library device disclosed in the Japanese Patent Application Laid-open No. Hei 04-319564, in the case of a magnetic tape library device in which its housing shelves to house media are arranged in up-and-down directions and in right and left directions, even if positions for storing media are deviated in every housing shelf, a stop position of a motor obtained, in advance, from measurements for every housing shelf by using a reflection sensor is stored and, when ordinary positioning operations are performed, a motor stop position is controlled by using data stored in memory and, therefore, transport of a medium by using both a single carrying mechanism and a flag is made possible.

Moreover, in Japanese Patent Application Laid-open No. Hei 05-42723, a method is provided in which, by providing a targeted flag in every acceptance port of a housing shelf that houses two or more media and by correcting position data in memory according to a signal which detects the targeted flag by using a photoelectric sensor attached in a cartridge carrying mechanism, positioning control in every pitch to a position of a subsequent adjacent targeted flag is exerted.

In a magnetic tape library device disclosed in the Japanese Patent Application Laid-open No. Hei 05-42723, even in the case of the housing shelf that houses two or more media, since positioning control is exerted by mounting a targeted flag for every magnetic tape cartridge acceptance port of the housing shelf, by providing a reflection sensor or a like that detects an acceptance port of the housing shelf, unlike in the case of the technology stated in the Japanese Patent Application Laid-open No. Hei 04-319564, storing of data obtained by, in advance, detecting a stop position of a motor in memory is not required and, therefore, the number of required sensors can be reduced more when compared with the case of the Japanese Patent Application Laid-open No. Hei 04-319564.

Moreover, in Japanese Patent Application Laid-open No. Hei 05-42724, a method is provided in which, by mounting a targeted flag only on each acceptance port of any one of rows and any one of columns of a housing shelf that houses two or more media and by correcting position data in memory based on a signal that detects the targeted flag by using a photoelectric sensor attached in a cartridge carrying mechanism section to obtain position data, positioning control is exerted.

In a magnetic tape library device disclosed in the Japanese Patent Application Laid-open No. Hei 05-42724, the number of required sensors can be reduced more when compared with the case of Japanese Patent Application Laid-open No. Hei 04-319564 and positioning control can be exerted at the smaller number of targeted flags when compared with the case of the Japanese Patent Application Laid-open No. Hei 05-42723.

In Japanese Patent Application Laid-open No. Hei 10-92069, a method is provided in which, by mounting an accessor that takes out a medium from a specified cell, holds it and moves it to a record reproducing section or that takes out a medium from the record reproducing section, holds it and moves it to the specified cell on a cartridge housing section where two or more cells having the medium are arranged regularly in up-and-down directions and in right and left directions and by providing a positioning flag having a notch at an intermediate position between cells being adjacent to each other in order to stop the accessor at a position corresponding to a specified cell in the cartridge housing section and by detecting the notch using a positioning sensor, positioning of a cartridge carrying mechanism is performed.

In the magnetic tape library device disclosed in the Japanese Patent Application Laid-open No. Hei 10-92069, the number of required sensors can be reduced more when compared with the case of the Japanese Patent Application Laid-open No. Hei 04-319564 and positioning control can be exerted at the smaller number of targeted flags when compared with the case of the Japanese Patent Application Laid-open No. Hei 05-42723.

However, the magnetic tape library device disclosed in the Japanese Patent Application Laid-open No. Hei 04-319564 has a problem. That is, though one set of flags used to perform positioning of the carrying mechanism which transports a medium is sufficient and mounting of the flag for every magnetic tape cartridge acceptance port in the housing shelf is not required, a reflection sensor used to detect each acceptance port and memory used to store a position of each acceptance port, in addition to the flag sensor, are necessary, which, as a result, causes the device to be complicated. Moreover, in order to detect whether or not the magnetic tape cartridge is housed in each housing slot of the housing shelf, another sensor being different from those described above is required additionally.

Also, the magnetic tape library device disclosed in the Japanese Patent Application Laid-open No. Hei 05-42723 has a problem. That is, since the targeted flag for each magnetic tape cartridge acceptance port of the housing shelf in order to perform the positioning of the carrying mechanism used to transport the medium is mounted, unlike in the case of the magnetic tape cartridge device disclosed in the Japanese Patent Application Laid-open No. Hei 04-319564, the sensor to detect each acceptance port and the memory to store position data are not required, which enables the device to be simplified. However, in order to detect whether or not the magnetic tape cartridge is housed in each housing slot of the housing shelf, another sensor being different from the sensor used to detect a targeted flag is required additionally.

Also, the magnetic tape library device disclosed in the Japanese Patent Application Laid-open No. Hei 05-42724 has a problem. That is, since the targeted flag is attached only to part of each magnetic tape cartridge acceptance port of the housing shelf, the number of targeted flags can be reduced more when compared with the magnetic tape cartridge device disclosed in the Japanese Patent Application Laid-open No. Hei 05-42723, which enables the device to be simplified. However, in order to detect whether or not the magnetic tape cartridge is housed in each housing slot of the housing shelf, another sensor being different from the sensor used to detect a targeted flag is required additionally.

Furthermore, the magnetic tape library device disclosed in the Japanese Patent Application Laid-open No. 10-92069 has a problem. That is, since a positioning flag having a notch at an intermediate position between adjacent cells is mounted in order to perform positioning of a carrying mechanism used to transport a medium and positioning is performed by detecting the notch using the positioning sensor. However, the number of targeted flags can be reduced more when compared with the magnetic tape cartridge device disclosed in the Japanese Patent Application Laid-open No. Hei 05-42723, which enables the device to be simplified. However, in order to detect whether or not the magnetic tape cartridge is housed in each housing slot of the housing shelf, another sensor being different from the sensor used to a targeted flag is required additionally.

SUMMARY OF THE INVENTION

In view of the above, it is an object of the present invention to provide a cartridge carrying/housing device which is capable of reducing the number of sensors required for positioning of a carrying mechanism used to transport a medium and which requires no another sensor being different from a sensor for positioning to detect whether or not a magnetic tape cartridge is housed in each housing slot in a housing shelf.

According to a first aspect of the present invention, there is provided a cartridge carrying/housing device including:

a cartridge housing mechanism including two or more slots arranged in a specified direction and two or more positioning flags corresponding to the two or more slots in a one-to-one manner, the two or more slots each housing a cartridge having a storage medium; and a cartridge carrying mechanism including a positioning sensor for detecting the two or more positioning flags, which moves along the specified direction in which the two or more slots are arranged, and loads/unloads the cartridge in/from a targeted slot, based on an output signal from the positioning sensor;

wherein the positioning sensor also detects whether or not the cartridge is housed in the target slot of the cartridge housing mechanism.

In the foregoing first aspect, a preferable mode is one wherein the two or more positioning flags each include a light transmitting portion formed in each of two or more light intercepting bodies mounted in a one-to-one correspondence with the two or more slots in the cartridge housing mechanism.

Another preferable mode is one wherein the cartridge housing mechanism is configured so that, in a state in which the cartridge has been housed in the corresponding slot, a part of the housed cartridge protrudes through the corresponding slot, and that the housed cartridge and the corresponding light intercepting body are closely positioned or partially overlap each other, without the housed cartridge and the corresponding light transmitting portion overlapping each other.

An additional preferable mode is one wherein the cartridge housing mechanism is configured so that, in a state in which the cartridge has been housed in the corresponding slot, the housed cartridge and the light intercepting body adjacent to the corresponding light intercepting body are closely positioned or partially overlap each other, without the housed cartridge and the light transmitting portion formed in the light intercepting body adjacent to the corresponding light intercepting body overlapping each other.

A further preferable mode is one wherein the positioning sensor is placed at a port for loading or unloading the cartridge in the cartridge carrying mechanism, the positioning sensor including a light emitting device and a light receiving device each being put in an opposite manner so that an optical axis passes through the light transmitting portion.

Another preferable mode is one wherein the two or more light intercepting bodies each are placed between two the slots adjacent to each other, other than an outermost light intercepting body/an innermost light intercepting body which is paced at an outside of an outermost slot/an innermost slot.

Still another preferable mode is one wherein the two or more light intercepting bodies each are made up of a flat-plate shaped protrusion having a notch portion or a hole portion as the light transmitting portion.

A further preferable mode is one wherein the cartridge carrying mechanism has a home positioning flag and an origin point detecting sensor which can detect, by using the home positioning flag, that the cartridge carrying mechanism is at an origin point within a movement range is mounted at a specified position within a movement range of the cartridge carrying mechanism.

A still further preferable mode is one wherein the origin point detecting sensor is made up of a light emitting device and a light receiving device which are arranged so that an optical axis of the origin point detecting sensor is intercepted by the home positioning flag.

According to a second aspect of the present invention, there is provided a cartridge carrying/housing device including:

a cartridge housing mechanism including two or more slots arranged in a specified direction and an light transmitting portions being formed in each of two or more light intercepting bodies mounted in a one-to-one correspondence with the two or more slots, the two or more slots each housing a cartridge having a storage medium, the cartridge housing mechanism being configured so that, in a state in which the cartridge has been housed in the corresponding slot, a part of the housed cartridge protrudes through the corresponding slot, and that the housed cartridge and the corresponding light intercepting body are closely positioned or partially overlap each other, without the housed cartridge and the corresponding light transmitting portion overlapping each other; and a cartridge carrying mechanism including an optical positioning sensor for detecting the two or more light transmitting portions, which moves according to a stored number of stepping motor driving pulses determined by a present slot position and a targeted slot position to load or unload the targeted cartridge in and from the slot, based on an output signal from the optical positioning sensor;

wherein the optical positioning sensor also detects whether or not the cartridge is housed in the target slot of the cartridge housing mechanism.

In the foregoing second aspect, a preferable mode is one wherein, while the cartridge is being housed in the slot, a state that the cartridge has been housed in the slot is detected by using a signal indicating a position of the cartridge produced by the optical positioning sensor, whereas, while the cartridge is not housed in the slot, a state that the cartridge has not been housed in the slot is detected by using a signal indicating a position of the cartridge produced by the optical positioning sensor.

Also, a preferable mode is one wherein, when a deviation exceeding a tolerance range between a number of driving pulses counted before the optical positioning sensor detects the light transmitting portion and a stored number of the driving pulses occurs, the cartridge carrying mechanism is returned back to its origin point and is moved again to a targeted position.

Another preferable mode is one wherein, when a number of times of the origin point correction does not reach a specified number of times, movements of the cartridge carrying mechanism are repeated based on a corrected and stored value and, when the number of times of origin point correction exceeds a specified number of times, an operation is aborted.

Still another preferable mode is one wherein, when a deviation between a number of driving pulses counted before the optical positioning sensor detects the light transmitting portion formed in the targeted slot and a stored number of the driving pulses is within a tolerance range and when loading or unloading of the cartridge carrying mechanism is not terminated normally, a retry is made of again loading or unloading the cartridge by obtaining, while a stored number of driving pulses of the stepping motor is made to be changed, a number of driving pulses of the stepping motor acquired when the cartridge carrying mechanism is moved after the cartridge carrying mechanism has been returned back to its origin point of movement positions to the cartridge housing mechanism and by making an origin point correction to correct the stored number of driving pulses according to the obtained number of driving pulses of the stepping motor.

An additional preferable mode is one wherein, based on a number of times of the retries, a first step of letting the cartridge carrying mechanism move according to a first stored value, a second step of letting the cartridge carrying mechanism move according to a stored value obtained by increasing the first stored value by a specified number of pulses, and a third step of letting the cartridge carrying mechanism move according to a stored value obtained by decreasing the first stored value by a specified number of pulses are sequentially performed and, when neither normal loading nor unloading of a cartridge is performed even after a specified number of times of retries, an operation is aborted.

A further preferable mode is one wherein, when a deviation between a number of driving pulses counted before the optical positioning sensor detects the light transmitting portion formed in the targeted slot and a stored number of the driving pulses is within a tolerance range and when loading or unloading a cartridge by the cartridge carrying mechanism is terminated normally and when a number of retries of loading or unloading a cartridge by using the cartridge carrying mechanism in a same slot does not reach a specified number of times, an operation is terminated and, when the retries are made the specified number of times, a step of renewing a stored number of driving pulses to be changed to become the counted number of driving pulses is performed.

According to a third aspect of the present invention, there is provided a method for carrying and housing a cartridge in a cartridge carrying/housing device including: a cartridge housing mechanism including two or more slots arranged in a specified direction and an light transmitting portions being formed in each of two or more light intercepting bodies mounted in a one-to-one correspondence with the two or more slots, the two or more slots each housing a cartridge having a storage medium, the cartridge housing mechanism being configured so that, in a state in which the cartridge has been housed in the corresponding slot, a part of the housed cartridge protrudes through the corresponding slot, and that the housed cartridge and the corresponding light intercepting body are closely positioned or partially overlap each other, without the housed cartridge and the corresponding light transmitting portion overlapping each other; and a cartridge carrying mechanism including an optical positioning sensor for detecting the two or more light transmitting portions; the method including:

a step of letting the cartridge carrying mechanism move according to a stored number of stepping motor driving pulses determined by a present slot position and a targeted slot position to load or unload the targeted cartridge in and from the slot, based on an output signal from the optical positioning sensor; and a step of detect, while the cartridge is being housed in the slot, a state that the cartridge has been housed in the slot by using a signal indicating a position of the cartridge produced by the optical positioning sensor, whereas, while the cartridge is not housed in the slot, a state that the cartridge has not been housed in the slot by using a signal indicating a position of the cartridge produced by the optical positioning sensor.

In the foregoing third aspect, a preferable mode is one wherein, when a deviation exceeding a tolerance range between a number of driving pulses counted before the optical positioning sensor detects the light transmitting portion formed in the targeted slot and a stored number of the driving pulses occurs, the cartridge carrying mechanism is returned back to its origin point and is moved again to a targeted position.

Another preferable mode is one wherein, when a number of times of origin point correction does not reach a specified number of times, movements of the cartridge carrying mechanism are repeated based on a corrected stored value and when the number of times of origin point correction exceeds a specified number of times, an operation is aborted.

Still another preferable mode is one wherein, when a deviation between a number of driving pulses counted before the optical positioning sensor detects the light transmitting portion formed in the targeted slot and a stored number of the driving pulses is within a tolerance range and when loading or unloading of the cartridge carrying mechanism is not terminated normally, a retry is made of again loading or an loading the cartridge by obtaining, while a stored number of driving pulses of the stepping motor is made to be changed, a number of driving pulses of the stepping motor acquired when the cartridge carrying mechanism is moved after the cartridge carrying mechanism has been returned back to its origin point of movement positions to the cartridge housing mechanism and by making an origin point correction to correct a stored number of driving pulses according to the obtained number of driving pulses of the stepping motor.

A further preferable mode is one wherein, based on a number of times of the retries, a first step of letting the cartridge carrying mechanism move according to a first stored value, a second step of letting the cartridge carrying mechanism move according to a stored value obtained by increasing the first stored value by a specified number of pulses, and a third step of letting the cartridge carrying mechanism move according to a stored value obtained by decreasing the first stored value by a specified number of pulses are sequentially performed and, when neither normal loading nor unloading of a cartridge is performed even after a specified number of times of retries, an operation is aborted.

Another preferable mode is one wherein, when a deviation between a number of driving pulses counted before the optical positioning sensor detects the light transmitting portion formed in the targeted slot and a stored number of the driving pulses is within a tolerance range and when loading or unloading a cartridge by the cartridge carrying mechanism is terminated normally and when a number of retries of loading or unloading a cartridge by using the cartridge carrying mechanism in a same slot does not reach a specified number of times, an operation is terminated and, when the retries are made the specified number of times, a step of renewing a stored number of driving pulses to be changed to become the counted number of driving pulses is performed.

According to a fourth aspect of the present invention, there is provided a cartridge carrying/housing program to cause a computer to implement a method for carrying and housing a cartridge in a cartridge carrying/housing device including: a cartridge housing mechanism including two or more slots arranged in a specified direction and an light transmitting portions being formed in each of two or more light intercepting bodies mounted in a one-to-one correspondence with the two or more slots, the two or more slots each housing a cartridge having a storage medium, the cartridge housing mechanism being configured so that, in a state in which the cartridge has been housed in the corresponding slot, a part of the housed cartridge protrudes through the corresponding slot, and that the housed cartridge and the corresponding light intercepting body are closely positioned or partially overlap each other, without the housed cartridge and the corresponding light transmitting portion overlapping each other; and a cartridge carrying mechanism including an optical positioning sensor for detecting the two or more light transmitting portions; the method including:

a step of letting the cartridge carrying mechanism move according to a stored number of stepping motor driving pulses determined by a present slot position and a targeted slot position to load or unload the targeted cartridge in and from the slot, based on an output signal from the optical positioning sensor; and a step of detect, while the cartridge is being housed in the slot, a state that the cartridge has been housed in the slot by using a signal indicating a position of the cartridge produced by the optical positioning sensor, whereas, while the cartridge is not housed in the slot, a state that the cartridge has not been housed in the slot by using a signal indicating a position of the cartridge produced by the optical positioning sensor.

According to a fifth aspect of the present invention, there is provided a computer-readable storage medium which stores the cartridge carrying/housing program described above.

With the above configuration, a moving position of the picker can be checked and presence or absence of the magnetic cartridge in the cell can be detected based on detection of the notch formed in the cell by using the minimum number of sensors and, when the picker is moved ordinarily, by checking a position of the picker based on detection of a notch by the hand-pass sensor, a deviation in the number of stepping motor feeding pulses to drive the picker is detected and, therefore, when an error occurs that cumulative deviation caused by an out-of-step state of a stepping motor or a like exceeds a tolerance range, an origin point correction is made by moving the picker to its origin point, which can keep an amount of positional deviation small and, when the positional deviation is small, the picker can be moved directly among targeted positions without being returned to its origin point and can reduce an access distance to a targeted position or an access time required to reach the targeted position. Moreover, if an error that the positional deviation of the picker exceeds a tolerance range occurs frequently, by exerting control on learning to renew the number of feeding pulses depending on information about an amount of deviation in the number of the feeding pulses based on checking a position of the picker, an amount of positional deviation can be kept small while operations are performed.

BRIEF DESCRIPTION OF THE DRAWINGS

The above and other objects, advantages, and features of the present invention will be more apparent from the following description taken in conjunction with the accompanying drawings in which:

FIG. 8A is a diagram showing a detection pattern by a hand-pass sensor according to the embodiment of the present invention to be applied when a magnetic tape cartridge does not exist in the cell and FIG. 8B is a diagram showing a detection pattern by the hand-pass sensor according to the embodiment of the present invention to be applied when the magnetic tape cartridge exists in the cell;

DETAILED DESCRIPTION OF THE PREFERRED EMBODIMENTS

Best modes of carrying out the present invention will be described in further detail using various embodiments with reference to the accompanying drawings. In the embodiment described below, as an example of a cartridge carrying/housing device, a magnetic tape library device is employed.

Embodiment

Figure 1:
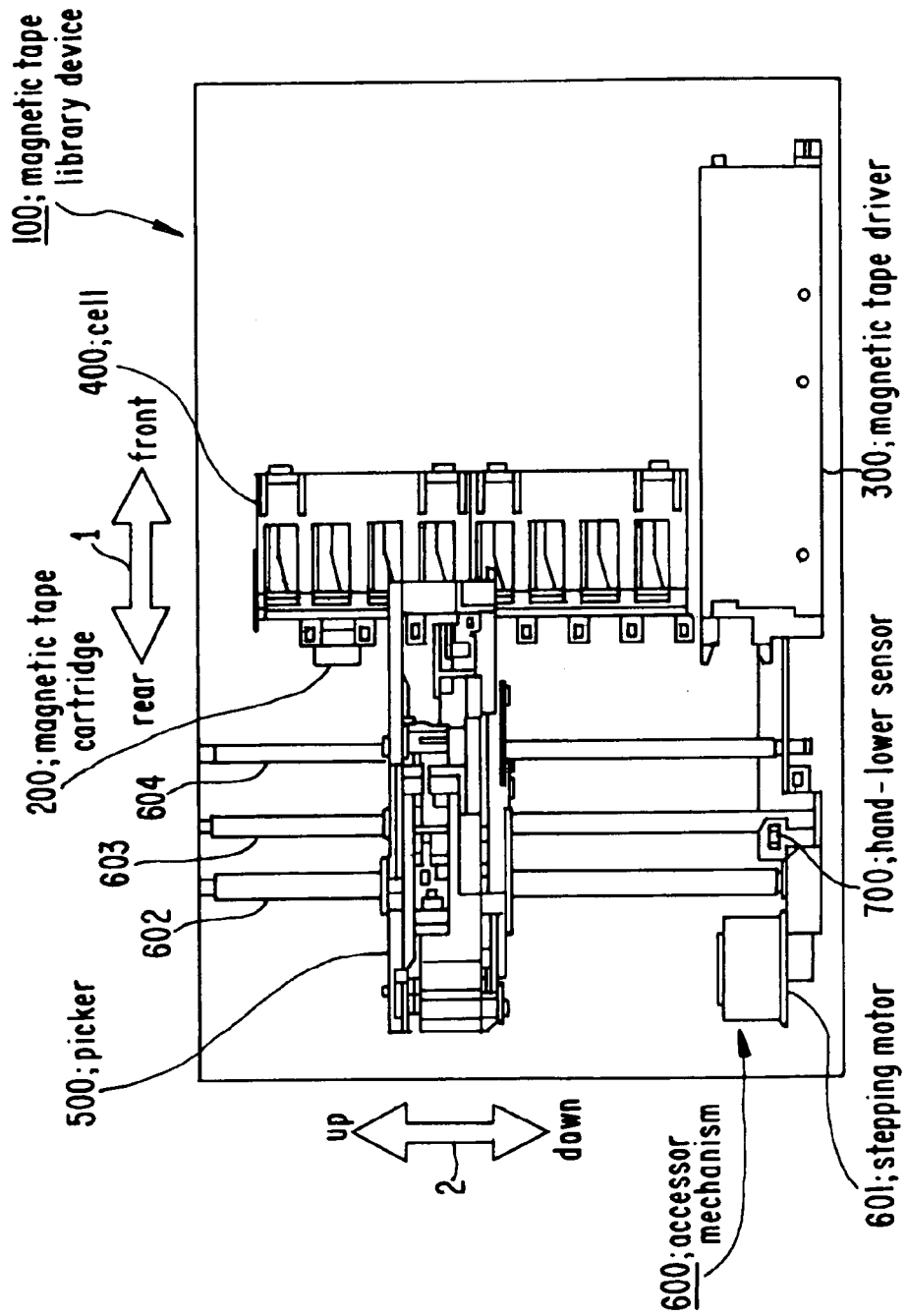
FIG. 1 is a side view showing a configuration of a magnetic tape library device according to an embodiment of the present invention.
Figure 2:
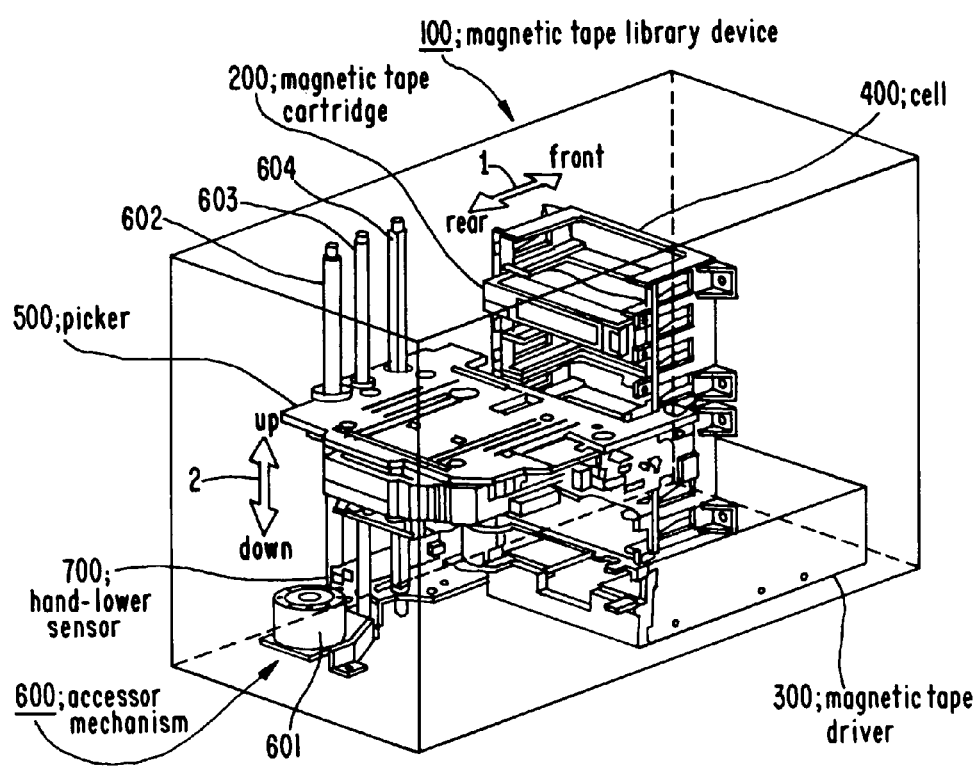
FIG. 2 is a perspective view showing the configuration of the magnetic tape library device according to the embodiment of the present invention.
Figure 3:
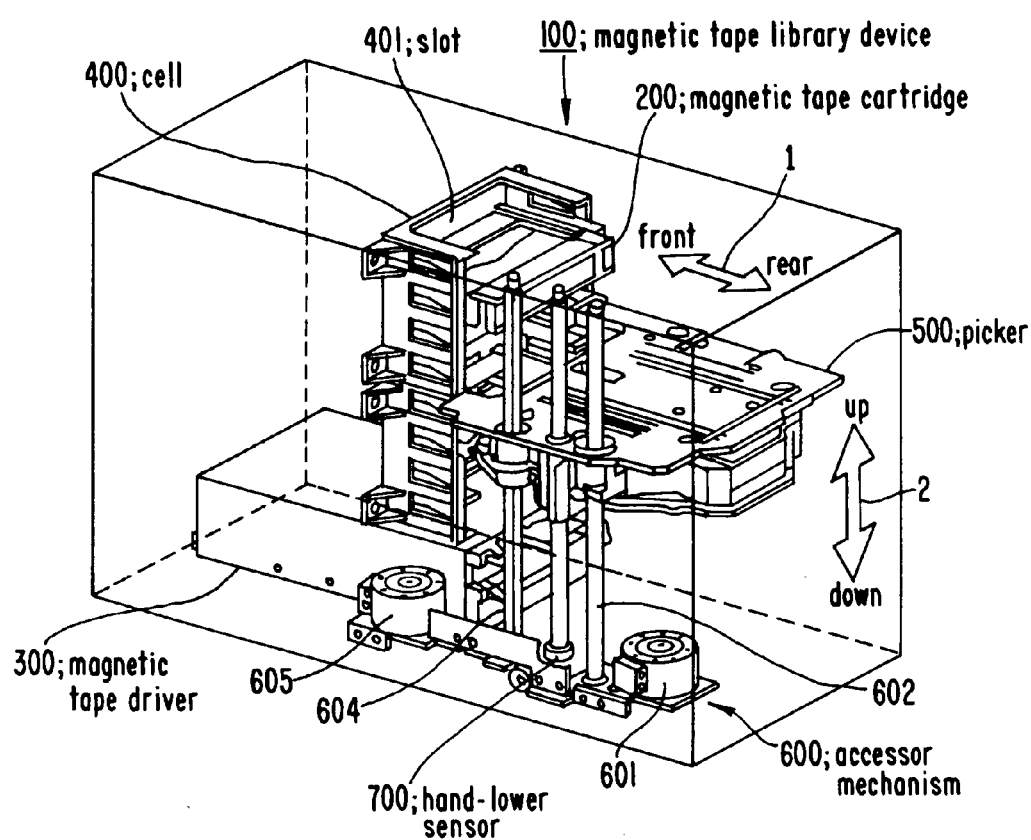
FIG. 3 is also another perspective view showing the configuration of the magnetic tape library device according to the embodiment of the present invention.
Figure 4:
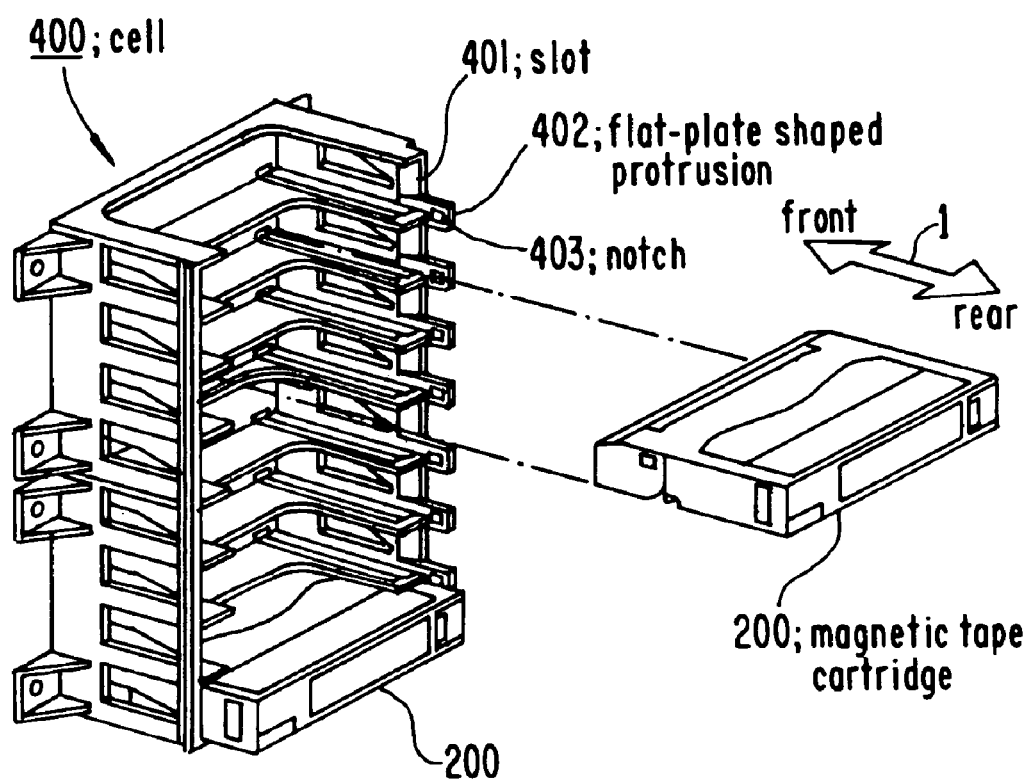
FIG. 4 is a perspective view showing a configuration of a cell according to the embodiment of the present invention.
Figure 5:
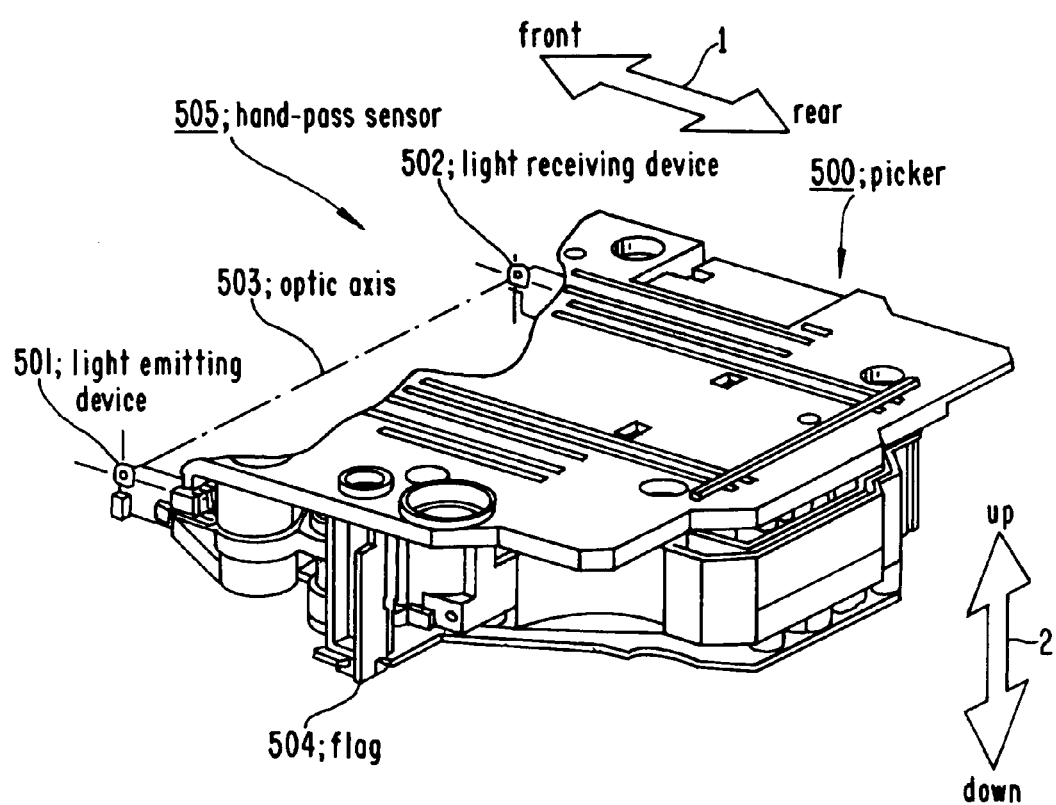
FIG. 5 is a perspective view showing a configuration of a picker according to the embodiment of the present invention.
Figure 6:
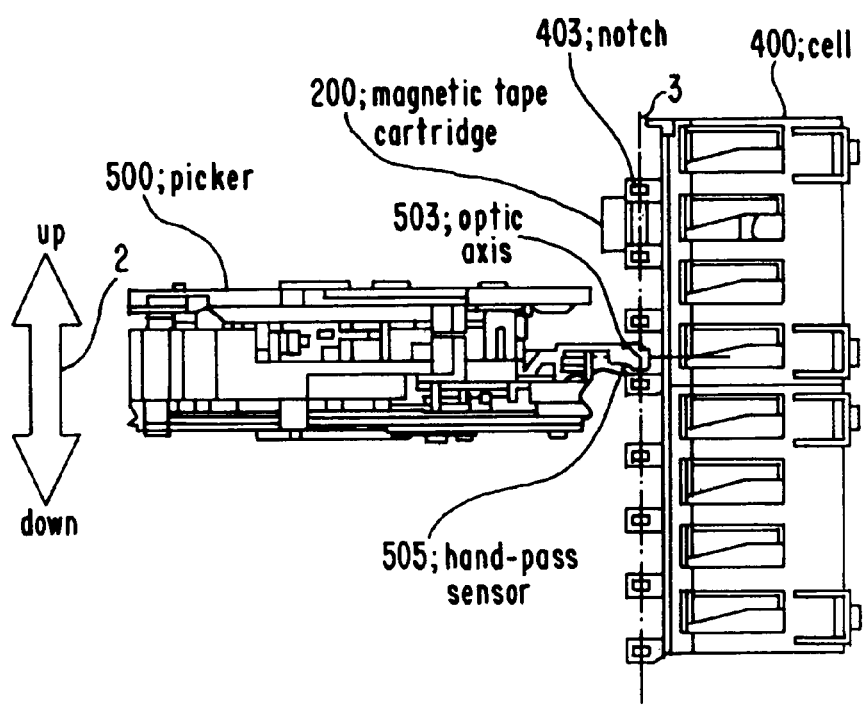
FIG. 6 is a diagram showing a positional relation between the picker and the cell according to the embodiment of the present invention.
Figure 7:
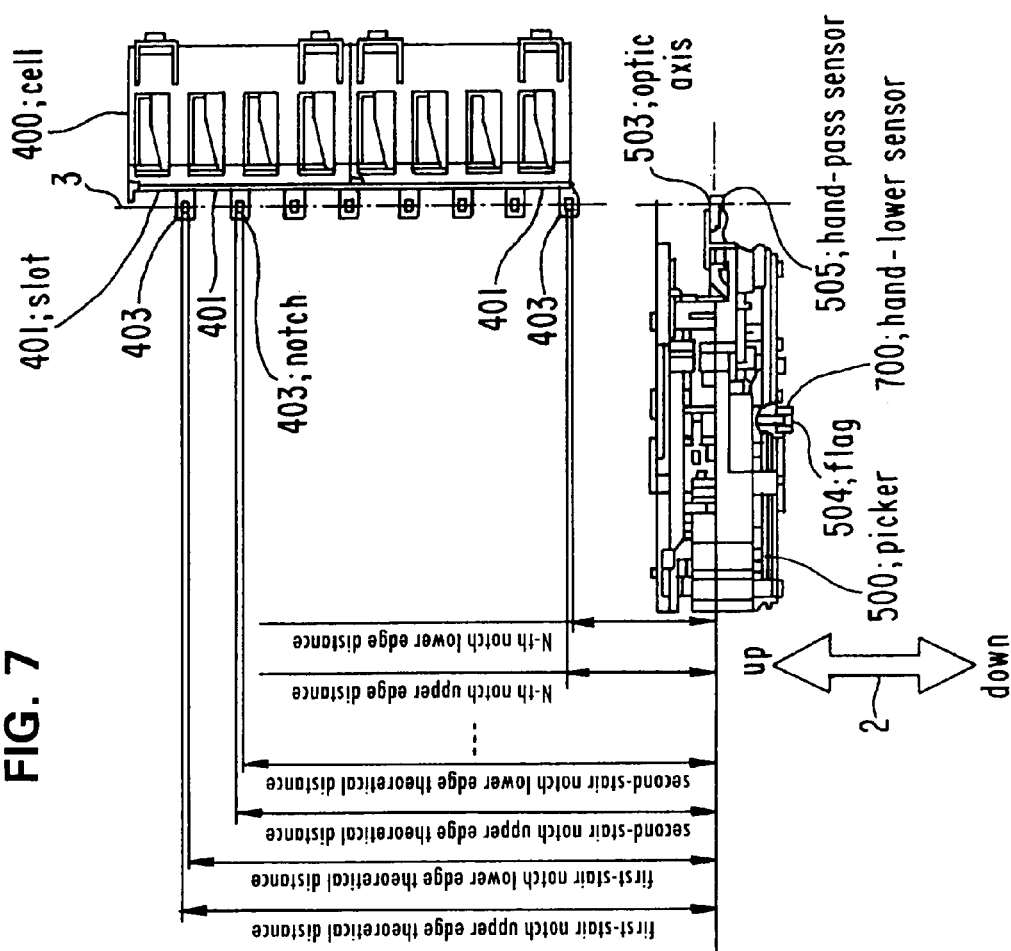
FIG. 7 is a diagram showing a theoretical movement distance of the picker according to the embodiment of the present invention.
Figure 9:
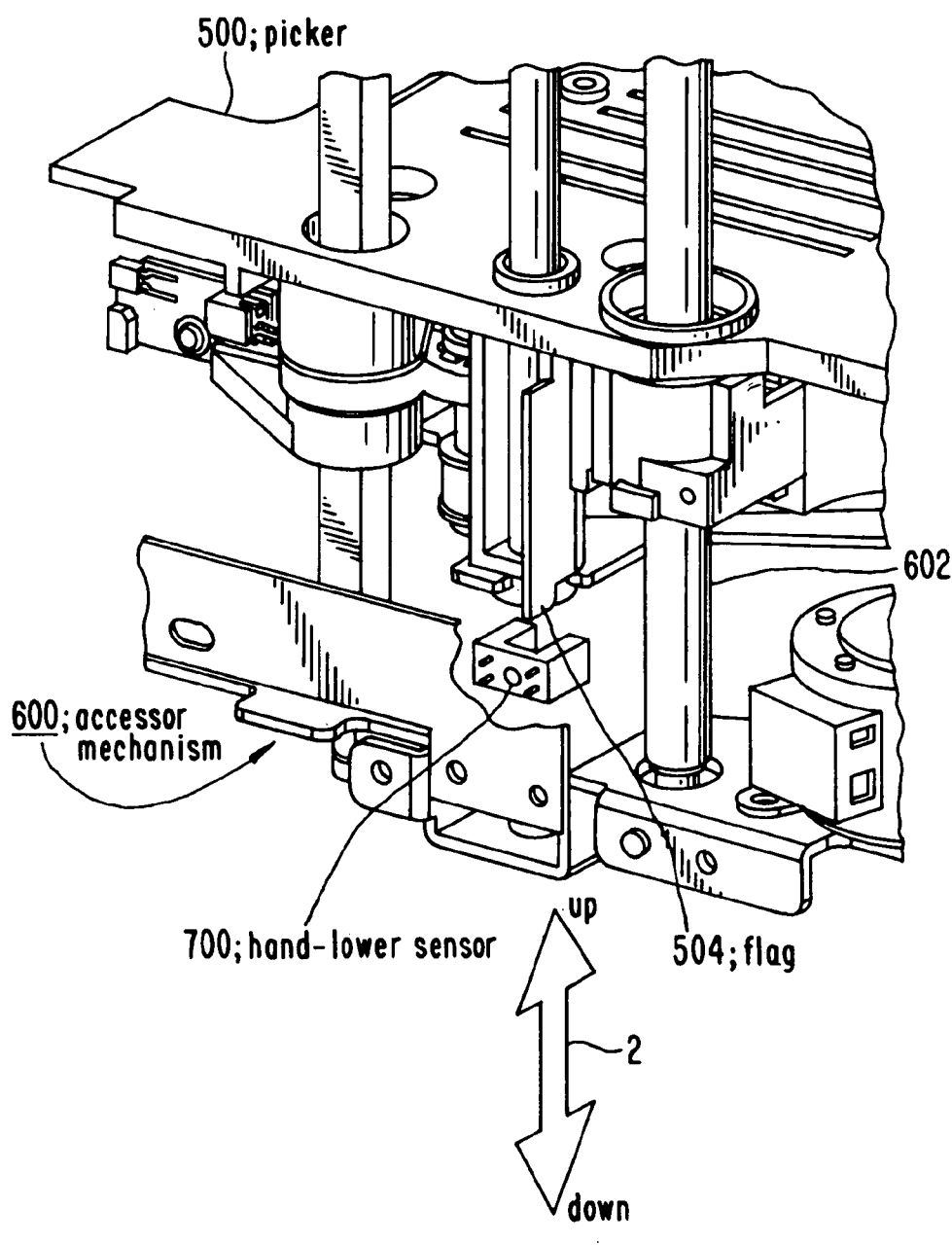
FIG. 9 is a detailed perspective view showing a configuration of a hand-lower sensor according to the embodiment of the present invention.
Figure 10:
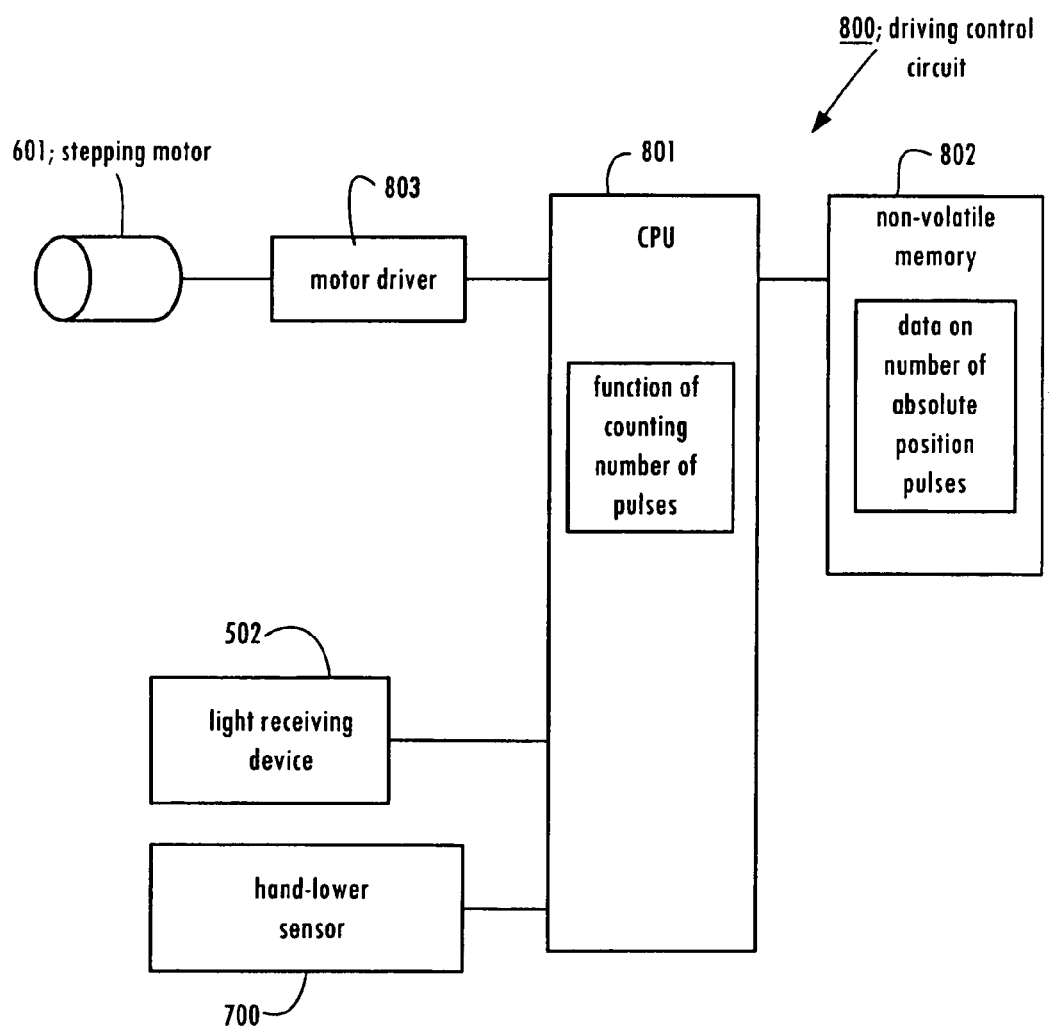
FIG. 10 is a block diagram showing a configuration of a circuit for controlling driving of the picker according to the embodiment of the present invention.
Figure 11:
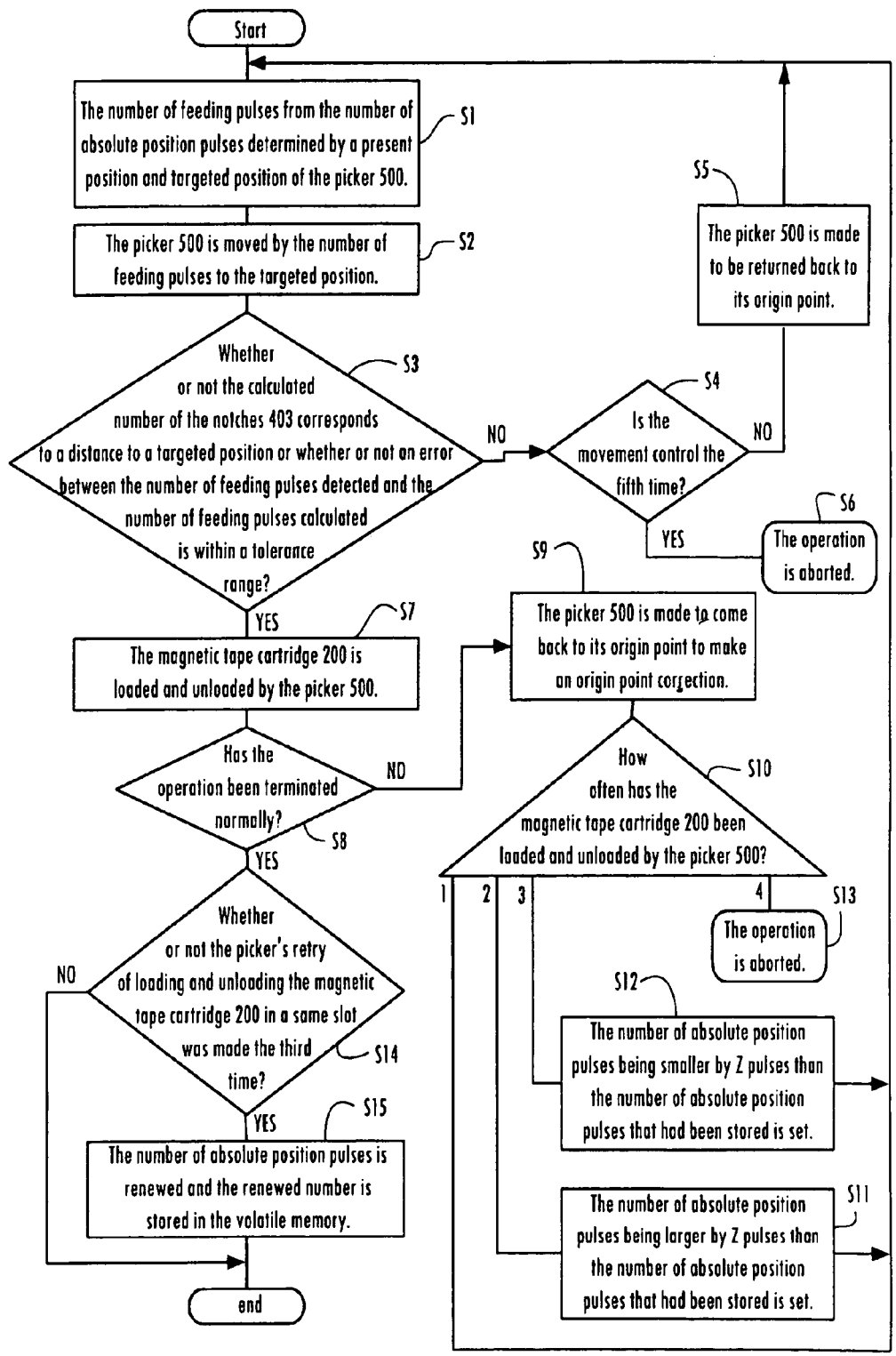
FIG. 11 is a flowchart explaining correction of the number of absolute position pulses employed in the embodiment of the present invention.

FIG. 1 is a side view of a magnetic tape library device according to an embodiment of the present invention. FIG. 2 is a perspective view of the magnetic tape library device according to the same embodiment. FIG. 3 is also a perspective view of the magnetic tape library device according to the same embodiment. FIG. 4 is a perspective view of a cell according to the same embodiment. FIG. 5 is a perspective view of a picker of the embodiment. FIG. 6 is a diagram showing a positional relation between the picker and the cell according to the same embodiment. FIG. 7 is a diagram showing a theoretical movement distance of the picker according to the same embodiment. FIG. 8A is a diagram showing a detection pattern by a hand-pass sensor according to the same embodiment to be applied when a magnetic tape cartridge does not exist in the cell and FIG. 8B is a diagram showing a detection pattern by the hand-pass sensor according to the same embodiment to be applied when the magnetic tape cartridge exists in the cell. FIG. 9 is a detailed perspective view showing a configuration of the hand-lower sensor according to the same embodiment. FIG. 10 is a block diagram showing a circuit configuration for controlling driving the picker according to the same embodiment. FIG. 11 is a flowchart explaining correction of the number of absolute position pulses according to the same embodiment.

The magnetic tape library device 100 according to the embodiment of the present invention chiefly includes, as shown in FIG. 1, FIG. 2 and FIG. 3, a magnetic tape driver 300, a cell 400, a picker 500, an accessor mechanism 600, and a hand-lower sensor 700, The magnetic tape driver 300 has a writing mechanism (not shown) which stores data in a magnetic tape and a reading mechanism (not shown) which reproduces data stored in the magnetic tape, when a magnetic tape cartridge 200 is inserted. The cell 400 is of a frame-shaped structure having two or more housing spaces (that is, slots 401) each corresponding to an outer shape of each of the thick-plate shaped magnetic tape cartridges so that two or more magnetic tape cartridges 200 can be housed in a manner that they can be overlaid on one another at specified intervals in a vertical direction and can be inserted or withdrawn in or from entrance ports of the slots 401 in a horizontal direction.

The picker 500 is so constructed as to be movable in up-and-down directions 2 along a face of an entrance port of a magnetic tape cartridge loading or unloading portion and so that a magnetic tape cartridge 200 loaded on the picker 500 is inserted in the entrance port of an arbitrary slot 401 in the cell 400 or in an entrance port of the magnetic tape driver 300 or so that a magnetic tape cartridge 200 having been inserted into the slot 500 is withdrawn and can be loaded on the picker to move it.

The accessor mechanism 600 is used to move the picker 500 that has loaded a magnetic tape cartridge 200 in up-and-down directions 2 and to drive so that a magnetic tape cartridge 200 loaded on the picker 500 is loaded or unloaded in or from the cell 400 or the magnetic tape driver 300.

That is, the picker 500 moves in up-and-down directions 2 by an amount of movements corresponding to the number of pulses applied to a stepping motor 601 by a lead shaft 602 made up of feeding screws, which rotates by being coupled to the stepping motor 601 attached to the accessor mechanism 600. A guide shaft 603 connected to the accessor mechanism 600 maintains a horizontal position of the picker 500 and, therefore, the picker 500 can move in up-and-down directions 2 while being kept in a horizontal position.

Moreover, the picker 500, by activating its cartridge inserting and withdrawing device (not shown) using driving force applied through a square shaft 604 from a driving motor 605 mounted on the accessor mechanism 600, loads or unloads a magnetic tape cartridge 200 on or from the magnetic tape driver 300 or the cell 400.

The hand-lower sensor 700 is made up of, for example, a photosensor having a light emitting section and a light receiving section mounted on part of the accessor mechanism 600, which is used to detect an origin point of the picker 500 in its up-and-down movements and also detects, by finding out a flag 504 mounted on the picker 500, that the picker 500 exists at its origin point at a lower edge in up-and-down directions.

FIG. 4 shows configurations of the cell 400 in detail. As shown in FIG. 4, the cell 400 has the slots 401 so that two or more magnetic tape cartridges 200 can be housed in each of the slots 401 in a manner that they are placed at specified intervals in up-and-down directions and so that one magnetic tape cartridge 200 can be inserted in or withdrawn from one slot 401 in front and rear directions 1. To a side of an aperture portion of each of the slots 401 is attached a flat-plate shaped protrusion 402. To the flat-plate shaped protrusion 402 is formed a hole-shaped notch 403.

FIG. 5 shows configurations of the picker 500 in detail. As shown in FIG. 5, the picker 500 has a function of loading or unloading a magnetic tape cartridge 200 in front and rear directions 1 by using its cartridge inserting and withdrawing device described above. The picker 500 has a hand-pass sensor 505 made up of a light emitting device 501 constructed of an LED (Light Emitting Diode) placed at either a right or left end of a front portion of the picker 500 and of a light receiving device 502 constructed of a photodiode or a like placed at either the left or right end of the front portion of the picker 500, in which light emitted from the light emitting device 501 can be received by the light receiving device 502.

If there is an object or something in a position of an optical axis 503 between the light emitting device 501 and the light receiving device 502, since light emitted from the light emitting device 501 is intercepted by it, the light receiving device 502 does not receive light, which enables the hand-pass sensor 505 to detect existence of the object.

Moreover, the picker 500 has a flag 504. When the hand-lower sensor 700 detects the presence of the flag 504, the magnetic tape library device detects that the picker 500 is at its origin point in its up-and-down movement.

On the picker 500 is mounted a cartridge inserting and withdrawing device (not shown) which is used to insert or withdraw a magnetic tape cartridge 200 in or from the magnetic tape driver 300 or in or from the cell 400. The cartridge inserting and withdrawing device has a grasping unit being equipped with a pair of grasping nail portions at its end portion and inserts a magnetic tape cartridge 200 into the magnetic tape driver 300 or the cell 400 by causing the grasping unit to move forward with the grasping nail portions kept open and withdraws the magnetic tape cartridge 200 from the magnetic tape driver 300 or from the cell 400 by causing the grasping unit to move backward with the grasping nail portions kept closed and with the magnetic tape cartridge 200 being grasped. However, these operations are not related directly to the present invention and no further description is made accordingly.

FIG. 6 shows a positional relation between the picker 500 and the cell 400 of the embodiment of the present invention. The hand-pass sensor 505 attached to an end of the picker 500 is on a track 3 crossing through the notch 403 of the cell 400 while the picker 500 moves in up-and-down directions 2. Therefore, when the picker 500 moves along the cell 400 in up-and-down directions 2, as shown in FIG. 4 and FIG. 6, the hand-pass sensor 505 can detect both the flat-plate shaped protrusion 402 in the cell 400 and the notch 403 formed in the flat-plate shaped protrusion 402 for every slot 401. In this exemplary embodiment, the flat-plate shaped protrusion 402 and noch 403 together from a positioning flag.

FIG. 7 is a diagram showing a theoretical movement distance of the picker 500 according to the embodiment of the present invention. As shown in FIG. 7, a theoretical distance between the optical axis 503 of the hand-pass sensor 505 and an upper edge of a first-stair notch 403 in the cell 400 (hereinafter be referred to as a first-stair notch upper edge theoretical distance) is determined by a position of the optical axis 503 of the hand-pass sensor 505 defined when the hand-pass sensor 505 stayed at its origin point and by a position of the upper edge of a first-stair notch 403 in the cell 400. A theoretical distance between the optical axis 503 of the hand-pass sensor 505 and a lower edge of the first-stair notch 403 in the cell 400 (hereinafter be referred to as a first-stair notch lower edge theoretical distance) is determined by the above position of the optical axis 503 of the hand-pass sensor 505 and by a position of a lower edge of the first-stair notch 403 in the cell 400. A theoretical distance between the optical axis 503 of the hand-pass sensor 505 and an upper edge of a second-stair notch 403 in the cell 400 (hereinafter be referred to as a second-stair notch upper edge theoretical distance) is determined by the above position of the optical axis 503 of the hand-pass sensor 505 and by a position of an upper edge of a second-stair notch 403 in the cell 400. A theoretical distance between the optical axis 503 of the hand-pass sensor 505 and a lower edge of the second-stair notch 403 in the cell 400 (hereinafter be referred to as second-stair notch lower edge theoretical distance) is determined by the above position of the optical axis 503 of the hand-pass sensor 505 and by a position of a lower edge of the second-stair notch 403 in the cell 400. Similarly, a theoretical distance between the optical axis 503 of the hand-pass sensor 505 and an upper edge of an N-th stair notch 403 in the cell 400 (hereinafter be referred to as N-th stair notch upper edge theoretical distance) is determined by the above position of the optical axis 503 of the hand-pass sensor 505 and by a position of an upper edge of the N-th stair notch 403 in the cell 400. A theoretical distance between the optical axis 503 of the hand-pass sensor 505 and a lower edge of the N-th stair notch 403 in the cell 400 (hereinafter be referred to as N-th stair notch lower edge theoretical distance) is determined by the above position of the optical axis 503 of the hand-pass sensor 505 and by a position of a lower edge of the N-th stair notch 403 in the cell 400.

FIGS. 8A and 8B are diagrams showing detection patterns by the hand-pass sensor 505 according to the embodiment of the present invention. In the magnetic tape library device 100 of the embodiment, the flat-plate shaped protrusion 402 of the cell 400 and the notch 403 formed in the flat-plate shaped protrusion 402 are mounted so that they can be apart from an end portion of the magnetic tape cartridge 200 having been inserted into the slot 401. Moreover, an end of the magnetic tape cartridge 200, while being inserted in the slot 401, extrudes through the notch 403 in the cell 400 in a manner that the end of the magnetic tape cartridge 200 fully intercepts a track 3 crossing through the notch 403 in the cell 400. Therefore, when the magnetic tape cartridge 200 is inserted into the slot 401 of the cell 400, in a positional range straddling the magnetic tape cartridge 200 and the flat-plate shaped protrusion 402, an interval between end portions of the magnetic tape cartridges 200 is blocked by the flat-plate shaped protrusion 402 and therefore only the notches 403 are detected by the hand-pass sensor 505.

When the magnetic tape cartridge 200 is not inserted into the slot 401 in the cell 400, as shown in FIG. 8A, the slot 401 and the notch 403 formed in the flat-plate shaped protrusion 402 receive light while portions other than the notch 403 formed in the flat-plate shaped protrusion 402 do not receive light. Thus, a pattern 4 of receipt or interception of light to be operated by the hand-pass sensor 505 is formed by movements of the picker 500.

On the other hand, when the magnetic tape cartridge 200 is inserted into the slot 401 of the cell 400, as shown in 8B, since the flat-plate shaped protrusion 402 blocks the interval between the ends of the magnetic tape cartridges 200, only the notch 403 receives light and portions other than the notch 403 do not receive light. Thus, a pattern 4A of receipt or interception of light by the hand-pass sensor 505 is provided when the picker 500 moves.

Thus, the magnetic tape library device 100 according to the embodiment of the present invention, by using the pattern of receipt or interception of light by the hand-pass sensor 505, detects not only the notch 403 but also whether or not the magnetic tape cartridge 200 has been inserted into each of the slots 401 in the cell 400.

FIG. 9 is a detailed perspective view of the hand-lower sensor 700 of the embodiment of the present invention. The hand-lower sensor 700 is placed in a lower portion of the magnetic tape library device and made up of a photo-sensor, mounted on the accessor mechanism 600, constructed of a U-shaped frame in which a light emitting device and light receiving device are mounted in a manner that they face each other. The picker 500 moves in up-and-down directions 2 according to rotation of the lead shaft 602 to perform positioning operations. When the picker 500 is placed at a place other than its origin point, since the flag 504 attached to a lower portion of the picker 500 is placed apart from the hand-lower sensor 700, light emitted from the light emitting device to the light receiving device in the hand-lower sensor 700 is not intercepted and therefore light emitted from the light emitting device is detected by the light receiving device. On the other hand, when the picker 500 is lowered and reaches its origin point, since the flag 504 is put between the light emitting device and the light receiving device of the hand-lower sensor 700, light emitted from the light emitting device is intercepted and therefore the light receiving device does not detect light emitted from the light emitting device. When this state occurs, the magnetic library device recognizes that the picker 500 is at its origin point. Moreover, the origin point serving as a reference point for the positioning control is determined as an intermediate position between a point at which the light receiving device comes not to detect light when the picker 500 is lowered and a point at which the light receiving device comes to detect light when the picker 500 is raised.

FIG. 10 is a block diagram showing the driving control circuit 800 of the picker 500 in the magnetic tape library device of the embodiment of the present invention, which chiefly includes a control section 801, a non-volatile memory 802, a motor driver 803.

The control section 801 has a CPU (Central Processing Unit) and operates to output a driving control signal to the motor driver 803 in response to signals from the hand-pass sensor 505 used to detect the notch 403 of the cell 400, and the hand-lower sensor 700 used to detect an origin point (home position) of the picker 500 according to data on the number of absolute position pulses read from the non-volatile memory 802. The non-volatile memory 802 stores data on the number of absolute position pulses required to move the picker 500 to a targeted position. The number of pulses occurring when the stepping motor 601 rotates and the number of notches 403 by which the picker 500 has passed are counted by a function of counting the number of pulses which is realized in a form of software in the control section 801. The motor driver 803 outputs a pulse signal that rotates the stepping motor 601 in response to driving signals fed from the control section 801.

Next, operations of the magnetic tape library device of the embodiment of the present invention are described below by referring to FIG. 1 to FIG. 10. The accessor mechanism 600, as shown in FIG. 3, is used to move the picker 500, in up-and-down directions, by using the stepping motor 601 made up of feeding screws and being rotated by the stepping motor 601, as an actuator. The origin of point for the movement of the picker 500 is defined as a point at which the hand-lower sensor 700 detects the picker 500 and the movement of the picker 500 toward each of the slots 401 is controlled according to the number of feeding pulses obtained by counts starting from the origin point.

By using, as the number of feeding pulses, a value (that is, the number of absolute position pulses being stored in the non-volatile memory 802) obtained by making a correction to the theoretical number of pulses determined at time of designing to produce the actual number of pulses calculated from calibration operations, positioning of the picker 500 for each of the slots 401 of the cell 400 is exactly controlled. Here, the theoretical number of pulses denotes a number obtained by converting a theoretical distance between the origin of point being a position in which the hand-lower sensor 700 detects the picker 500 as shown in FIG. 7 and a height of each of the notches 403 from the origin of point, into the number of pulses.

When the number of actual pulses is counted by calibration, some following cases occur, That is, as shown in FIGS. 8A and 8B, since the state of light acceptance or light interception by the hand-pass sensor 505 is changed when the presence of the notch 403 is detected every time the hand-pass sensor 505 of the picker 500 passes by a position of each of the slots 401, a position of each notch 403 can be confirmed, however, at this point, the detected position of each notch 403 may be deviated due to a dimensional error in each component making up the magnetic tape library device 100.

By comparing the number of pulses obtained from the change state in the light acceptance or light interception by the hand-pass sensor 505 with the number of pulses obtained by measurements of the distance between the origin point of the picker 500 and the theoretical position of the notch 403, an amount of positional deviation to be corrected for can be calculated and therefore the calibrated number of feeding pulses can be determined by using the above amount. The determined number of feeding pulses is stored, as the number of absolute position pulses, in the non-volatile memory 802.

Since a position of the picker 500 is always checked by the hand-pass sensor 505 in a state in which the picker 500 is normally operated, a deviation, caused by out-of-step states of the stepping motor 601 or a like, between a movement distance based on the number of feeding pulses (the number of absolute position pulses) to be obtained before the picker 500 reaches a targeted position and an actual movement distance, can be monitored. If the deviation exceeds a tolerance range, the picker 500 is returned back to its origin point and a retry of repeating the movement control is made. The picker 500, when the picker 500 has to be moved to a targeted position, in order to reduce an access distance to a targeted position or an access time required to reach the targeted position, is not made to be returned back to its origin point while being operated ordinarily and is moved directly between a present position and a targeted position. Therefore, no correction of the origin point is made for every movement of the picker 500. If displacement occurs due to the above way of the movement and a deviation between the number of absolute position pulses and actual number of feeding pulses exceeds a tolerance range and, as a result, an error that loading or unloading of the magnetic tape cartridge 200 is not performed by the picker 500 occurs frequently, the picker 500 is moved to its origin point and a retry of determining feeding pulses acquired by correcting the origin of point is made. Examples of failures in loading or unloading the magnetic tape cartridge 200 by using the picker 500 include such cases in which the magnetic tape cartridge 200, when it is to be inserted, cannot be inserted due to collision of the magnetic tape cartridge 200 with a shelf portion of the cell 400 and in which the magnetic tape cartridge 200, when it is to be withdrawn, cannot be grasped by the cartridge inserting and withdrawing device due to the displacement of the picker 500 and, as a result, cannot be withdrawn. The control section 801 judges, when such the state has been detected, that an error is produced.

When a failure occurs in loading or unloading the magnetic tape cartridge 200, a retry of correcting the origin point while changing the number of absolute position pulses is repeated to calibrate the number of absolute position pulses, however, if the number of retries increases, the operation is aborted. Moreover, when the pickier 500 is moved at time of its ordinary operation, if an error that a positioning deviation exceeds a tolerance range occurs, by renewing the number of absolute position pulses by an amount of the occurred deviation, positioning control is exerted while learning is being made.

Moreover, when the magnetic tape cartridge 200 is inserted into the slot 401 as shown in FIG. 8B, since the optical axis 503 of the hand-pass sensor 505 of the picker 500 is intercepted by the magnetic tape cartridge 200, the detection pattern 4A consisting of light acceptance or light interception by the hand-pass sensor 505 is made different from the detection pattern 4 obtained in the state where the magnetic tape cartridge 200 is not inserted into the slot 401 as shown in FIG. 8A, whether or not the magnetic tape cartridge 200 has been inserted into the slot 401 of the cell 400 can be checked.

Such the function of checking that the magnetic tape cartridge 200 is inserted into the cell 400 can be used for various applications, for example, as follow:

(1) By using this function, it is made possible to check a state of stocks of the magnetic tape cartridge 200 in each slot 401 in a cell 400. By employing the hand-pass sensor 505, two or more magnetic tape cartridges 200 being stocked in a same column can be detected as a whole and, therefore, stock management of the magnetic tape cartridge 200 can be performed in a shorter time.

(2) By using this function, it is made possible to prevent an error of a try of double insertion of a magnetic tape cartridge 200 into a slot 401 in which another magnetic tape cartridge 200 has been already inserted.

(3) By using this function, it is made possible to prevent an error of a try of withdrawing a magnetic tape cartridge 200 from an empty slot 401 having no magnetic tape cartridge 200 having been inserted.

The reason why a state in which the magnetic tape cartridge 200 has been inserted in each slot 401 in a cell 400 can be checked by using the hand-pass sensor 505 while correction to the origin point for positioning of the magnetic tape cartridge 200 is being made is that the flat-shaped protrusion 402 has a width being enough to cover a clearance between the flat-shaped protrusion 402 and the magnetic tape cartridge 200 having been inserted and that the hand-pass sensor 505 can detect the notch 403, by forming the notch 403 in the flat-shaped protrusion 402, even in a state in which the magnetic tape cartridge 200 has been inserted into the cell 400. If such the methods as disclosed in the Japanese Patent Application Laid-open Nos. Hei 05-42723 and Hei 05-42724 are applied to the structure provided by the present invention in which the optical axis 503 of the hand-pass sensor 505 is intercepted by protrusion of an end portion of the magnetic tape cartridge 200 that has been inserted into a cell 400, since the hand-pass sensor 505 becomes unable to receive any light, positioning itself of the magnetic tape cartridge 200 is made impossible.

FIG. 11 shows a flowchart explaining an example of operations of correction of the number of absolute position pulses in the magnetic tape library device 100 of the present invention. When positioning operations of the picker 500 to a targeted slot 401 are started, the control section 801 calculates the number of feeding pulses from the number of absolute position pulses being stored in the non-volatile memory 802, which is determined by a present position and a targeted position of the picker 500, moves the picker 500 by the number of the feeding pulses using the stepping motor 605 (Step S2) and detects the number of notches 403 by which the picker 505 has passed by using the hand-pass sensor 505 to count it by using the function of counting the number of pulses.

When the picker 500 reaches a targeted position, the control section 801 judges whether or not the calculated number of notches 403 corresponds to a distance to a targeted position or whether or not an error between the counted number of feeding pulses detected by the hand-pass sensor 505 and the calculated number of feeding pulses is within a tolerance range (Step S3).

If the error between the calculated number of the notches 403 and the number of pulses is not within a tolerance range, the control section 801 judges whether or not the movement control on the picker 500 is exerted the fifth time (Step S4) and, if the movement control is not the fifth one, returns the picker 500 back to the origin point (Step S5) and the routine then returns to Step S1 and the same processing is repeated again. If the movement control is the fifth one, the operation is aborted (Step S6). On the other hand, if the error between the calculated number of the notches 403 and the number of pulses is within a tolerance range, the control section 801 lets the picker 500 load and unload the magnetic tape cartridge 200 (Step S7) and judges whether or not the operation is terminated normally (Step S8). In Step S8, if the operation of loading or unloading the magnetic tape cartridge 200 is not terminated normally, the picker 500 is made to come back to its origin point to make an origin point correction (Step S9) and a retry of loading or unloading the magnetic tape cartridge 200 is made.

Then, the control section 801 judges how often the magnetic tape cartridge 200 has been loaded and unloaded (Step S10) by the picker 500 and, if the number of retries N is 1, the routine returns to Step S1 and the number of feeding pulses are calculated again and steps to be thereafter followed are repeated. Moreover, when the number of retries N=2, the number of absolute position pulses being larger by Z pulses than the number of absolute position pulses that had been stored is set to the non-volatile memory 802 (Step S11) and the routine returns to Step S1 and the same processing is repeated. When the number of retries N=3, the number of absolute position pules being smaller by Z pulses than the number of absolute position pulses that had been stored is set to the non-volatile memory 802 (Step S12) and the routine returns to Step S1 and the same processing is repeated. When the number of retries N=4, the operation is aborted (Step S13).

Moreover, when operations of loading or unloading the magnetic tape cartridge 200 are terminated normally in Step S8, the control section 801 judges whether or not the picker's retry of loading or unloading the magnetic tape cartridge 200 in a same slot 401 was made the third time (Step S14). If the retry is not the third one, the control section 801 terminates the operation and, if the retry is the third one, renews the number of absolute position pulses stored in the non-volatile memory 802 to become the counted number of feeding pulses, stores the renewed number in the non-volatile memory 802 (Step S15) and terminates the operations.

Thus, with the magnetic tape library device 100 of the embodiment, since the hand-pass sensor 505 checks a position of the picker 500 when moving in an ordinary way, an origin point of the picker 500 is not moved to make an origin point correction of the number of feeding pulses before a deviation of the actual number of pulses exceeds a tolerance range causing an error due to frequent occurrence of an out-of-step state of the stepping motor 601 and, therefore, the picker 500 can be moved directly among targeted positions without being returned to its origin point for every operation, which, as a result, enables an access distance to a targeted position or an access time required by the picker 500 to reach the targeted position to be made smaller.

It is apparent that the present invention is not limited to the above embodiments but may be changed and modified without departing from the scope and spirit of the invention. For example, in the above embodiment, the hand-lower sensor 700 detects a flag of the picker 500 by using a photo-sensor made up of the light-emitting device and light-receiving device, however, other methods for detection may be employed. That is, a position of the picker 500 can be detected by using a micro-switch or a like which can detect the position by mechanical contact, which enables reduction of costs accordingly.

Moreover, in the above embodiment, the picker 500 is moved by the feeding screw, however, other methods may be employed. The picker 500 may be moved by driving a belt using a stepping motor 601, which can reduce mechanical noises. The picker 500 may be moved by using a rack and a pinion gear. In some cases, this method is useful if there is mechanical limitation in mounting such the feeding screw or the belt. Additionally, in the above embodiment, the magnetic tape cartridge is loaded or unloaded in the up-down directions or the picker 500 is moved in the up-down directions. However, they may be loaded or unloaded or moved in other directions. That is, if the device is so constructed to be longer in a horizontal direction, the device may be moved in a horizontal direction. Moreover, the notch 403 may be not only hole-shaped but also nicked-shaped, which can achieve simple fabrication of the magnetic tape cartridge device.

What is claimed is:

1. A cartridge carrying/housing device comprising:
   a cartridge housing mechanism including two or more slots arranged in a specified direction and two or more positioning flags corresponding to said two or more slots in a one-to-one manner, said two or more slots adapted to individually house cartridges having a storage mediums; and
   a cartridge carrying mechanism including a positioning sensor for detecting said two or more positioning flags, which moves along said specified direction in which said two or more slots are arranged, and loads/unloads a cartridge in/from a target slot of the two or more slots, based on an output signal from said positioning sensor,
   wherein said positioning sensor also detects whether or not said cartridge is housed in said target slot of said cartridge housing mechanism.

2. The cartridge carrying/housing device according to claim 1, wherein said two or more positioning flags each comprise a light transmitting portion and a light intercepting body.

3. The cartridge carrying/housing device according to claim 2, wherein, when said cartridge is housed in a corresponding slot of the two or more slots:
   said cartridge housing mechanism is configured so that a part of the housed cartridge protrudes from the corresponding slot; and
   the housed cartridge and a corresponding light intercepting body of a corresponding positioning flag of the two or more positioning flags are closely positioned or partially overlap each other, without the housed cartridge and a corresponding light transmitting portion of the corresponding positioning flag overlapping each other.

4. The cartridge carrying/housing device according to claim 3, wherein, when said cartridge is housed in the corresponding slot:
   said cartridge housing mechanism is configured so that the housed cartridge and another light intercepting body of another positioning flag of the two or more positioning flags adjacent to the corresponding light intercepting body are closely positioned or partially overlap each other, without the housed cartridge and a light transmitting portion formed in the another light intercepting body overlapping each other.

5. The cartridge carrying I housing device according to claim 2, wherein:
   said positioning sensor is placed at a port for loading or unloading said cartridge in said cartridge carrying mechanism;
   said positioning sensor comprises a light emitting device and a light receiving device each being put in opposition so that an optical axis therebetween is adapted to pass through said light transmitting portion.

6. The cartridge carrying/housing device according to claim 2, wherein said two or more light intercepting bodies each are individually placed between two of said slots adjacent to each other, other than an outermost light intercepting body/an innermost light intercepting body which is paced at an outside of an outermost slot/an innermost slot.

7. The cartridge carrying/housing device according to claim 2, wherein said two or more light intercepting bodies each comprise a flat-plate shaped protrusion having a notch portion or a hole portion as said light transmitting portion.

8. The cartridge carrying/housing device according to claim 1, wherein:
   said cartridge carrying mechanism comprises a home positioning flag and an origin point detecting sensor which can detect, by using said home positioning flag, that said cartridge carrying mechanism is at an origin point within a movement range of said cartridge carrying mechanism; and
   said origin point detecting sensor is mounted at a specified position within a the movement range of said cartridge carrying mechanism.

9. The cartridge carrying/housing device according to claim 8, wherein said origin point detecting sensor comprises a light emitting device and a light receiving device which are arranged so that an optical axis of said origin point detecting sensor is intercepted by said home positioning flag.

10. A cartridge carrying/housing device comprising:
    a cartridge housing mechanism including two or more slots arranged in a specified direction and light transmitting portions being formed in each of two or more light intercepting bodies mounted in a one-to-one correspondence with said two or more slots, said two or more slots adapted to individually house cartridges having a storage mediums, said cartridge housing mechanism being configured so that, when said cartridge is housed in a corresponding slot of the two or more slots, a part of the housed cartridge protrudes from the corresponding slot, and the housed cartridge and a corresponding light intercepting body of the light intercepting bodies are closely positioned or partially overlap each other, without the housed cartridge and a corresponding light transmitting portion of the corresponding light intercepting body overlapping each other; and
    a cartridge carrying mechanism including an optical positioning sensor for detecting said light transmitting portions, which moves according to a stored number of stepping motor driving pulses determined by a present slot position and a target slot position to load or unload a target cartridge in and from a target slot of the two or more slots, based on an output signal from said optical positioning sensor,
    wherein said optical positioning sensor also detects whether or not said cartridge is housed in said target slot of said cartridge housing mechanism.

11. The cartridge carrying/housing device according to claim 10, wherein:
    when said cartridge is housed in said target slot, a state that said cartridge is housed in said target slot is detected by using a signal indicating a position of said cartridge produced by said optical positioning sensor; and when said cartridge is not housed in said target slot, a state that said cartridge is not housed in said target slot is detected by using a signal indicating a position of said cartridge produced by said optical positioning sensor.

12. The cartridge carrying/housing device according to claim 10, wherein, when the cartridge carrying mechanism initially moves the target cartridge to the target slot, and when a deviation exceeding a tolerance range between a number of driving pulses counted before said optical positioning sensor detects a target light transmitting portion corresponding to the target slot, and a the stored number of driving pulses occurs, said cartridge carrying mechanism is returned back to its origin point and is subsequently moved again to the target slot.

13. The cartridge carrying/housing device according to claim 12, wherein:

when a number of times that the cartridge carrying mechanism is returned back to its origin point is less than a specified number of times, the subsequent movement of the cartridge carrying mechanism is performed; and when said number of times that the cartridge carrying mechanism is returned back to its origin point exceeds a specified number of times, the subsequent movement of the cartridge carrying mechanism is aborted.

14. The cartridge carrying/housing device according to claim 10, wherein, when the cartridge carrying mechanism initially moves the target cartridge to the target slot, and when a deviation between a an initial number of driving pulses counted before said optical positioning sensor detects said light transmitting portion corresponding to the target slot and a the stored number of said driving pulses is within a tolerance range, and when loading or unloading of said cartridge carrying mechanism is not terminated normally, a retry is made, where the cartridge carrying mechanism is returned to its origin point of movement with respect to the cartridge housing mechanism, and is subsequently moved again to the target slot.

15. The cartridge carrying/housing device according to claim 14, wherein:

when a first retry is made, the cartridge carrying mechanism moves according to the stored number of driving pulses;

when a second retry is made, the cartridge carrying mechanism moves according to a second stored number of driving pulses obtained by increasing the stored number of driving pulses by a specified number of pulses; and when a third retry is made, the cartridge carrying mechanism moves according to a third stored number of driving pulses obtained by decreasing the stored number of driving pulses by a another specified number of pulses.

16. The cartridge carrying/housing device according to claim 10, wherein, when the cartridge carrying mechanism moves the target cartridge to the target slot, and when a deviation between a number of driving pulses counted before said optical positioning sensor detects said light transmitting portion corresponding to the target slot and a the stored number of said driving pulses is within a tolerance range, and when loading or unloading a cartridge by said cartridge carrying mechanism is terminated normally, and when a number of retries of loading or unloading a cartridge by using said cartridge carrying mechanism in the target slot does not reach a maximum specified number of times, an operation is terminated, and, when said number of retries reaches a specified number of times less than the maximum, the stored number of stepping motor driving pulses is changed to become the counted number of driving pulses.

17. A method for carrying and housing a cartridge in a cartridge carrying/housing device comprising: a cartridge housing mechanism including two or more slots arranged in a specified direction and light transmitting portions being formed in each of two or more light intercepting bodies mounted in a one-to-one correspondence with said two or more slots, said two or more slots adapted to individually house cartridges having a storage mediums, said cartridge housing mechanism being configured so that, when said cartridge is housed in a corresponding slot of the two or more slots, a part of the housed cartridge protrudes from the corresponding slot, and the housed cartridge and a corresponding light intercepting body of the light intercepting bodies are closely positioned or partially overlap each other, without the housed cartridge and a corresponding light transmitting portion of the corresponding light intercepting body overlapping each other; and a cartridge carrying mechanism including an optical positioning sensor for detecting said transmitting portions; said method comprising:

moving said cartridge carrying mechanism according to a stored number of stepping motor driving pulses determined by a present slot position and a target slot position to load or unload a target cartridge in and from a target slot of the two or more slots, based on an output signal from said optical positioning sensor; and detecting, whether or not said cartridge is housed in said target slot by using a signal produced by said optical positioning sensor.

18. The method for carrying and housing a cartridge according to claim 17, wherein, when the cartridge carrying mechanism initially moves the target cartridge to the target slot, and when a deviation exceeding a tolerance range between a number of driving pulses counted before said optical positioning sensor detects a target light transmitting portion corresponding to the target slot, and a the stored number of driving pulses occurs, said cartridge carrying mechanism is returned back to its origin point and is subsequently moved again to the target slot.

19. The method for carrying and housing a cartridge according to claim 18, wherein:

when a number of times that the cartridge carrying mechanism is returned back to its origin point is less than a specified number of times, the subsequent movement of the cartridge carrying mechanism is performed; and when said number of times that the cartridge carrying mechanism is returned back to its origin point exceeds a specified number of times, the subsequent movement of the cartridge carrying mechanism is aborted.

20. The method for carrying and housing a cartridge according to claim 17, wherein, when the cartridge carrying mechanism initially moves the target cartridge to the target slot, and when a deviation between a an initial number of driving pulses counted before said optical positioning sensor detects said light transmitting portion corresponding to the target slot and a the stored number of driving pulses is within a tolerance range, and when loading or unloading of said cartridge carrying mechanism is not terminated normally, a retry is made, where the cartridge carrying mechanism is returned to its origin point of movement with respect to the cartridge housing mechanism, and is subsequently moved again to the target slot.

21. The method for carrying and housing a cartridge according to claim 20, wherein:
   when a first retry is made, the cartridge carrying mechanism moves according to the stored number of driving pulses;
   when a second retry is made, the cartridge carrying mechanism moves according to a second stored number of driving pulses obtained by increasing the stored number of driving pulses by a specified number of pulses; and
   when a third retry is made, the cartridge carrying mechanism moves according to a third stored number of driving pulses obtained by decreasing the stored number of driving pulses by a another specified number of pulses.

22. The method for carrying and housing a cartridge according to claim 17, wherein, when the cartridge carrying mechanism moves the target cartridge to the target slot, and when a deviation between a number of driving pulses counted before said optical positioning sensor detects said light transmitting portion corresponding to the target slot and a the stored number of said driving pulses is within a tolerance range, and when loading or unloading a cartridge by said cartridge carrying mechanism is terminated normally, and when a number of retries of loading or unloading a cartridge by using said cartridge carrying mechanism in the target slot does not reach a maximum specified number of times, an operation is terminated, and, when said number of retries reaches a specified number of times less than the maximum, the stored number of stepping motor driving pulses is changed to become the counted number of driving pulses.

23. A computer readable medium for storing therein a cartridge carrying/housing program to cause a computer to implement a method for carrying and housing a cartridge in a cartridge carrying/housing device comprising: a cartridge housing mechanism including two or more slots arranged in a specified direction and light transmitting portions being formed in each of two or more light intercepting bodies mounted in a one-to-one correspondence with said two or more slots, said two or more slots adapted to individually house cartridges having a storage mediums, said cartridge housing mechanism being configured so that, when said cartridge is housed in a corresponding slot of the two or more slots, a part of the housed cartridge protrudes from the corresponding slot, and the housed cartridge and a corresponding light intercepting body of the light intercepting bodies are closely positioned or partially overlap each other, without the housed cartridge and a corresponding light transmitting portion of the corresponding light intercepting body overlapping each other; and a cartridge carrying mechanism including an optical positioning sensor for detecting said transmitting portions; said method comprising:
   moving said cartridge carrying mechanism according to a stored number of stepping motor driving pulses determined by a present slot position and a target slot position to load or unload a target cartridge in and from a target slot of the two or more slots, based on an output signal from said optical positioning sensor; and
   detecting whether or not said cartridge is housed in said target slot by using a signal produced by said optical positioning sensor.

24. The cartridge carrying/housing device according to claim 2, wherein, when the cartridge is mounted in the target slot:
   an end of the cartridge protrudes from the target slot in a loading/unloading direction;
   the end of the cartridge is closely positioned or partially overlaps the light intercepting body in a sensing direction opposite to the loading/unloading direction; and
   the end of the cartridge is not overlapped by the light transmitting portion in the sensing direction.

25. The cartridge carrying/housing device according to claim 2, wherein:
   the positioning sensor comprises a light emitting device with an optical axis, and a light receiving device opposite to the light emitting device along the optical axis; and
   the cartridge carrying mechanism is aligned to load/unload the cartridge from the target slot when the optical axis of the positioning sensor passes through a light transmitting portion of a target positioning flag of the flags, arranged adjacent to the target slot.

26. The cartridge carrying/housing device according to claim 2, wherein said positioning flags are individually arranged between pairs of the slots.

27. The cartridge carrying/housing device according to claim 15, wherein, when a fourth retry is made, the operation is aborted.

28. The method for carrying and housing a cartridge according to claim 21, wherein, when a fourth retry is made, the operation is aborted.

29. The cartridge carrying/housing device according to claim 15, wherein the specified number of pulses is equal to the initial number of driving pulses counted before said optical positioning sensor detects said light transmitting portion.

30. The method for carrying and housing a cartridge according to claim 21, wherein the specified number of pulses is equal to the initial number of driving pulses counted before said optical positioning sensor detects said light transmitting portion.

31. A cartridge carrying/housing device comprising:
   a cartridge housing mechanism comprising slots stacked in a first direction, and positioning flags individually arranged adjacent to respective ones of the slots, wherein each slot is adapted to hold a cartridge containing a storage medium; and
   a cartridge carrying mechanism comprising a picker that is movable in the first direction to load or unload a cartridge from a target slot of the slots, and a positioning sensor arranged on the movable picker and adapted to detect the positioning flags and whether a cartridge is arranged in each of the slots.

32. The cartridge carrying/housing device according to claim 31, wherein:
   the positioning flags each comprise a protruding flat-plate-shaped light intercepting body and a light transmitting portion formed therein; and
   the positioning sensor comprises a light emitting device and an opposing light receiving device, and is arranged on the picker so that an optical axis between the light emitting device and the opposing light receiving device is adapted to pass through said light transmitting portion.

33. The cartridge carrying/housing device according to claim 31, further comprising a control section adapted to move the picker to the target slot in accordance with a stored number of driving pulses and a detected number of positioning flags.

34. A method for carrying and housing a cartridge in a cartridge carrying/housing device comprising a cartridge housing mechanism comprising slots stacked in a first direction, and positioning flags individually arranged adjacent to respective ones of the slots, wherein each slot is adapted to hold a cartridge containing a storage medium, and a cartridge carrying mechanism comprising a picker that is movable in the first direction to load or unload a cartridge from a target slot of the slots, and a positioning sensor adapted to detect the positioning flags and whether a cartridge is arranged in each of the slots, the method comprising:
- determining whether or not a cartridge is housed in each of the slots;
- retrieving a number of driving pulses required to move the picker from a first position to the target slot;
- moving the picker from the first position to the target slot in accordance with the retrieved number of driving pulses;
- detecting a number of positioning flags that the picker passes during its movement from the first position to the target slot; and
- confirming whether the retrieved number of driving pulses and the detected number of positioning flags are within a predetermined tolerance range.

35. The method for carrying and housing a cartridge in a cartridge carrying/housing device according to claim 34, further comprising:
- when the retrieved number of driving pulses and the detected number of positioning flags are within a predetermined tolerance range, beginning a load or unload operation of a cartridge from the target slot; and
- when the retrieved number of driving pulses and the detected number of positioning flags are not within a predetermined tolerance range, returning the picker to the first position, and repeating the respective retrieving, moving, detecting and confirming operations.

36. The method for carrying and housing a cartridge in a cartridge carrying/housing device according to claim 35, further comprising:
- confirming whether the load or unload operation of a cartridge from the target slot is normal;
- when the load or unload operation of a cartridge from the target slot is normal, proceeding with the loading or unloading of the cartridge from the target slot; and
- when the load or unload operation of a cartridge from the target slot is not normal, returning the picker to the first position, and repeating the respective retrieving, moving, detecting and confirming operations.

37. A computer readable medium for storing therein a cartridge carrying/housing program to cause a computer to implement a method for carrying and housing a cartridge in a cartridge carrying/housing device comprising a cartridge housing mechanism comprising slots stacked in a first direction, and positioning flags individually arranged adjacent to respective ones of the slots, wherein each slot is adapted to hold a cartridge containing a storage medium, and a cartridge carrying mechanism comprising a picker that is movable in the first direction to load or unload a cartridge from a target slot of the slots, and a positioning sensor adapted to detect the positioning flags and whether a cartridge is arranged in each of the slots, the method comprising:
- determining whether or not a cartridge is housed in each of the slots;
- retrieving a number of driving pulses required to move the picker from a first position to the target slot;
- moving the picker from the first position to the target slot in accordance with the retrieved number of driving pulses;
- detecting a number of positioning flags that the picker passes during its movement from the first position to the target slot; and
- confirming whether the retrieved number of driving pulses and the detected number of positioning flags are within a predetermined tolerance range.

38. The method for carrying and housing a cartridge in a cartridge carrying/housing device according to claim 37, further comprising:
- when the retrieved number of driving pulses and the detected number of positioning flags are within a predetermined tolerance range, beginning a load or unload operation of a cartridge from the target slot; and
- when the retrieved number of driving pulses and the detected number of positioning flags are not within a predetermined tolerance range, returning the picker to the first position, and repeating the respective retrieving, moving, detecting and confirming operations.

39. The method for carrying and housing a cartridge in a cartridge carrying/housing device according to claim 38, further comprising:
- confirming whether the load or unload operation of a cartridge fromthe target slot is normal;
- when the load or unload operation of a cartridge from the target slot is normal, proceeding with the loading or unloading of the cartridge from the target slot; and
- when the load or unload operation of a cartridge from the target slot is not normal, returning the picker to the first position, and repeating the respective retrieving, moving, detecting and confirming operations.

40. A cartridge carrying/housing device comprising:
- a cartridge housing mechanism comprising slots stacked in a first direction, and positioning flags individually arranged adjacent to respective ones of the slots, wherein each slot is adapted to hold a cartridge containing a storage medium;
- a cartridge carrying mechanism comprising a picker that is movable in the first direction to load or unload a cartridge from a target slot of the slots, and a positioning sensor adapted to detect the positioning flags and whether a cartridge is arranged in each of the slots; and
- a control section adapted to move the picker to the target slot in accordance with a stored number of driving pulses and a detected number of positioning flags.

* * * * *